United States Patent [19]

Czeban et al.

[11] Patent Number: 4,869,124

[45] Date of Patent: Sep. 26, 1989

[54] CONTROL SYSTEM FOR APPARATUS

[75] Inventors: Sandor (Stan) J. Czeban; Kenneth W. Stittle, both of Brampton, Canada

[73] Assignee: Canadiana Outdoor Products Inc., Brampton, Canada

[21] Appl. No.: 33,955

[22] Filed: Apr. 3, 1987

[30] Foreign Application Priority Data

Apr. 4, 1986 [CA] Canada .................................... 505908

[51] Int. Cl.⁴ .............................................. G05G 1/04
[52] U.S. Cl. .................................... 74/526; 74/483 R; 74/532; 37/245; 180/19.1; 56/11.3
[58] Field of Search ............. 74/523, 526, 528, 483 R, 74/532, 473 R, 500.5, 501.6, 565, 545; 56/10.8, 11.3, 11.8; 37/244, 245, 246, 248, 249–252, 257, 254, 259; 180/19.1, 334, 272; 192/.098, 1.29, 11, 1.31, 3.63

[56] References Cited

U.S. PATENT DOCUMENTS

| | | | |
|---|---|---|---|
| 2,536,166 | 1/1951 | Garland | 37/245 |
| 2,689,620 | 9/1954 | Hainke . | |
| 2,932,213 | 4/1960 | Hale | 74/483 X |
| 3,156,205 | 11/1964 | Reeber et al. | 74/483 PB |
| 3,285,361 | 11/1966 | Baker | 74/483 X |
| 4,062,135 | 12/1977 | Dobberpuhl | 37/245 |
| 4,230,200 | 10/1980 | Carolan | 180/272 |
| 4,277,936 | 7/1981 | Hoff . | |
| 4,476,643 | 10/1984 | Hilchey et al. | 74/523 X |

FOREIGN PATENT DOCUMENTS

| | | |
|---|---|---|
| 1130324 | 8/1982 | Canada . |
| 1154357 | 9/1983 | Canada . |
| 2904021 | 9/1979 | Fed. Rep. of Germany . |

Primary Examiner—Rodney M. Lindsey
Attorney, Agent, or Firm—Kenneth M. Garrett

[57] ABSTRACT

A dead-man lever control system for apparatus such as a snow blower or lawnmower includes a latch and key arrangement connected to the levers which permits the levers to be operated independently or conjointly, and which also permits one lever to be locked out by the other. Provision may be made for the locked-out lever to over-ride the lock-out by applying a greater than normal force to the lever.

6 Claims, 4 Drawing Sheets

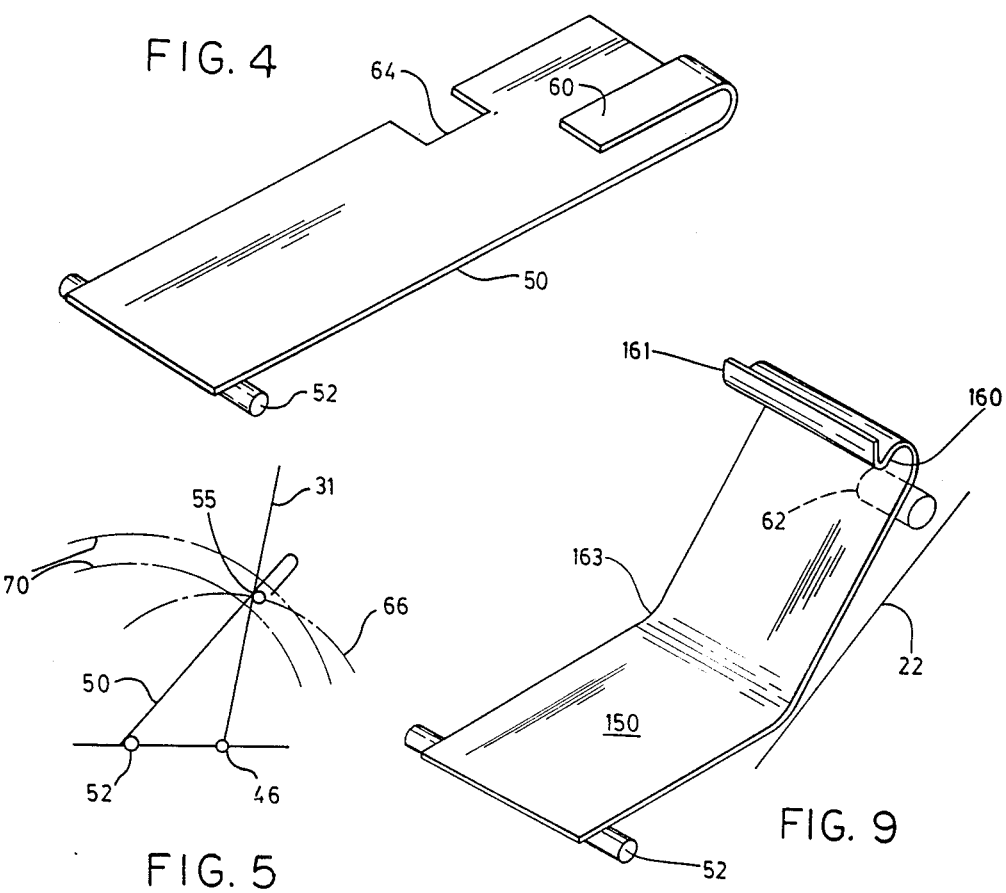
FIG. 4
FIG. 9
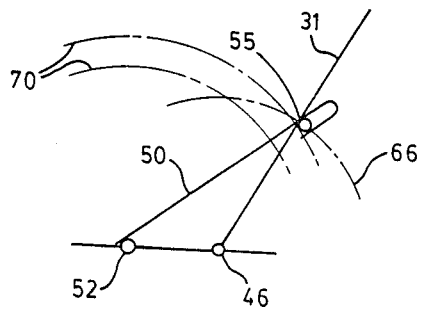
FIG. 5
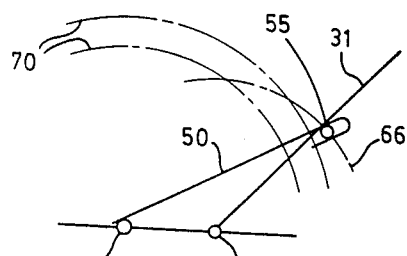
FIG. 6
FIG. 7

CONTROL SYSTEM FOR APPARATUS

FIELD OF INVENTION

This invention relates to mechanized apparatus and a control system therefor. It particularly relates to mechanized apparatus wherein two functions are connected to a prime-mover by clutches, and wherein dead-man levers are provided to operate the clutches between an off-position and an on-position although it may find broader uses, including use in non-mechanized apparatus.

BACKGROUND OF INVENTION

In Canadian Pat. No. 1,130,324 to Vanderhoef, there is described a dead-man control system for a snow blower or like apparatus. Such apparatus has a handle including a horizontal bar portion. The dead-man controls comprised a pair of levers pivotally connected to the handle respective at each side of the horizontal portion. The handles were horizontally elongated and the inwardly facing ends thereof located in proximity whereby they could be grasped by a single hand and retained in their operative position. Such levers were at all times independently operable.

It is known, for example in German OFFEN. No. 2904021 to Miyazawa et al, to provide dead-man levers which are dependently operable in a single hand operation. However, in such system there is no provision for the independent operation of the levers. It is further known, for example, in Canadian Pat. No. 1,154,357 to Hilchey et al to provide dead-man levers that are independently operable, but which may be conjointly operated in a single hand operation by the actuation of a third lever which overlaps the dead-man levers. In such system the dead-man levers must be released prior to the use of the overlapping lever.

Under some circumstances it may be desirable to inactivate one function, while retaining the other function active. An example of such circumstance is where a lawnmower is being self propelled over ground where it is not desired that the cutting blade be rendered operative.

While the foregoing problems could in principle be overcome by the use of sophisticated electronic controls, this would add significantly to the cost of the type of apparatus generally envisaged by the invention, such as lawnmowers and snow blowers, and would be generally non-economic.

SUMMARY OF THE INVENTION

It is an object of this invention to provide a lever control system wherein the levers may be independently operated or dependently operated.

It is a further object of this invention to provide a lever control system wherein the levers may be retained in an operative condition by a single hand.

It is also an object of this invention to provide a lever control system wherein one lever may be rendered inoperative by the actuation of the other lever.

It is another object of this invention to provide a lever control system wherein the one lever may be rendered inoperative by the actuation of the other lever, but wherein the inoperative condition may be over-ridden.

It is another object of this invention to provide a lever control system wherein one lever may be released from its operative position by the actuation of the other lever.

It is a still further object of this invention to provide a lever control system which is simple, robust and economic, whereby it does not add significantly to the cost of the apparatus with which it is employed.

In accordance with a broad aspect of the invention, a control system comprises first and second levers each movable between first and second positions for actuating first and second functions of the apparatus from an "off" condition to an "on" condition. At least the first lever will have a key means mounted thereon for movement with the lever on a path. Latch means is provided having a keyway for entry by the key means. The latch means is mounted for movement with the second lever to cause the entry to the keyway to move along a path which intersects the path of the key means at a predetermined location of the first and second levers prior to either reaching its second position. The latch then serves to interfere with the passage of the first lever to its second position when the second lever is previously moved to its second position, thereby locking out the first lever.

The second lever may serve to retain the first lever in its operative position where the second lever is povided with a (second) key means, and the latch a (second) keyway for capturing this key means.

The first keyway may be provided at the entry thereof with a resiliently deformable lip; the lip will provide the required interference to the passage of the first lever to its second position, but on exerting greater pressure upon the first lever, the lip will deform, to permit the first key means to enter the keyway thereof.

In accordance with one embodiment of the invention, the intersecting paths locate when the first and second levers are each adjacent their first positions, and the keyway is formed by an opening through the latch. The operation of the first lever prior to the operation of the second lever will cause the key means of the first lever to pass through the keyway; operation of the second lever will then trap the first lever behind the latch, so that it may be moved to its second position at all times. However, if the second lever is moved from its first position towards its second position prior to the movement of the first lever from its first position, the first lever will be locked out, and will not be movable into its second position.

In accordance with another embodiment of the invention, the paths intersect when the levers approach the second position thereof. Preferably the arrangement is symmetrical, which is to say that each lever is provided with a similar, opposing key means and the latch with an identical keyway for each key means, the keyway serving to capture the key means when entered therein. When both key means are captured, the manual retention of either lever in its second position will serve to retain the other lever in its second position. Preferably, the keyway is entered by a key means when the lever associated therewith is at an arc of about 15° from the limit of its travel to its second position. This is generally within the limit of lost motion permitted by a clutch control, which is to say that the clutch will be engaged when the key means is being captured by, or released from, the keyway. Accordingly, if both levers are in their second positions, and one lever is released through an arc of 15°, the other lever will automatically release and return to its first position, while at all times maintaining the function controlled by the one lever operational.

The invention will now be described in relation to the preferred embodiments thereof taken in conjunction with the drawings, and from which other aims, objects and advantages of the invention will become apparent.

BRIEF DESCRIPTION OF THE DRAWINGS

FIG. 4 shows in perspective view from below, the latch of FIG. 3, and

FIGS. 5-7 show in schematic side elevation the operation of the latch with the progressive movement of the control handles from adjacent the first (off) position to their second (on) position.

FIGS. 8 and 9 are similar to FIGS. 3 and 4, showing a second embodiment of the invention.

DESCRIPTION OF THE PREFERRED EMBODIMENT

Figure 1:
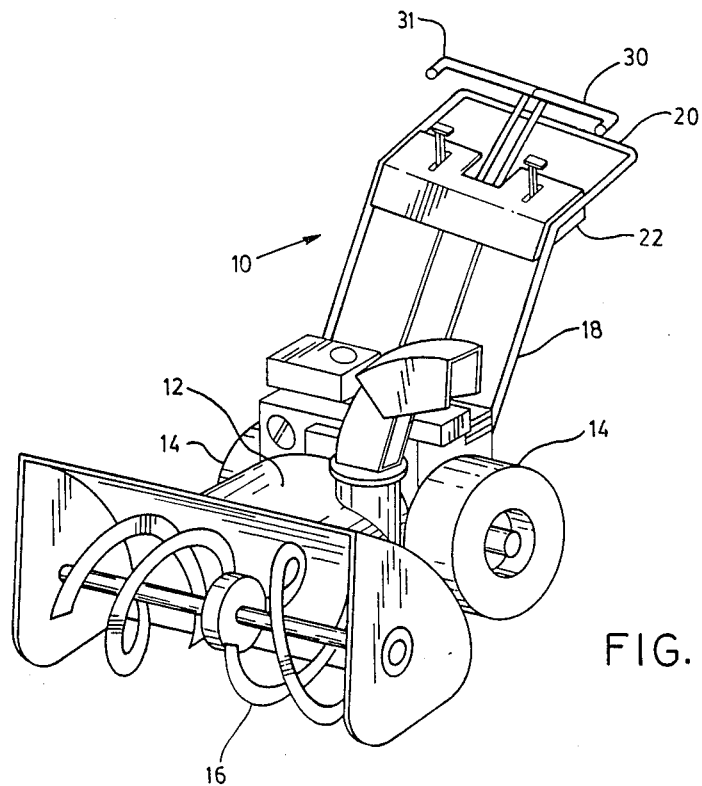
FIG. 1 shows from frontal, perspective view a snow blower incorporating the control system of the invention.

Referring to the drawings in detail, a snow blower is identified generally therein by the numeral 10. Snow blower 10 comprises a motor 12, wheels 14 and an auger 16 driven by the motor and connectible thereto by clutch means (not shown); suitable clutch means is shown in the above identified Canadian Patent of Vanderhoef, which is incorporated herein by reference thereto. Snow blower 10 further includes a handle 18 including a horizontal cross bar portion 20 which is conveniently grasped for the purpose of guiding the apparatus. A console 22 spans between the upright portions of handle 18 and is supported therefrom. Conventional controls such as accelerator 24 and choke 26 are mounted from console 22 for use in modulating the output of motor 12.

A pair of dead-mean handles 30,31 which may for the sake of convenience be referred to as levers, are mounted from console 22. Lever 30 is connected by a link 32 to the wheel clutch, and may be referred to as the wheel control lever; similarly lever 31 is connected by a link 33 to the auger, and may be referred to as the auger control lever.

Figure 2:
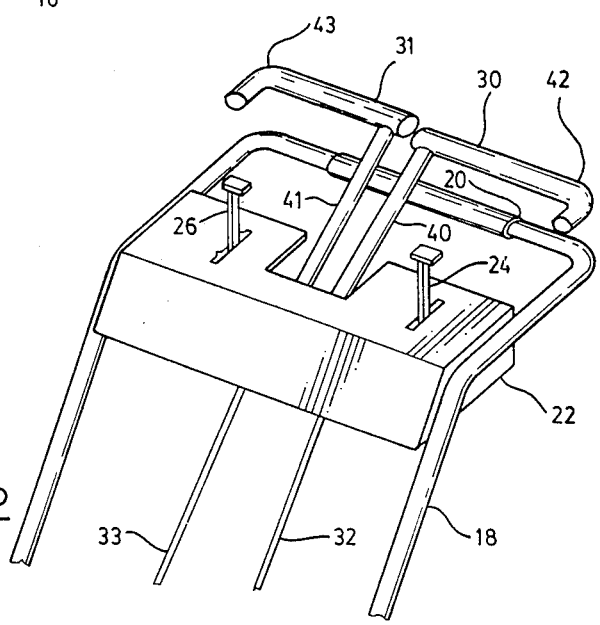
FIG. 2 shows in enlarged frontal perspective view of the handle portion of the snow blower of FIG. 1.

Lever 30 comprises a shank 40 and an outwardly turned head 42. Lever 31 is the mirror image of lever 30, and similarly comprises a shank 41 and head 43. The proximal ends 44,45 of the shanks 40,41 are mounted by an axle 46 which passes transversely through the shanks and which serves to space them apart, and bearings 48 secured to console 22. Levers 30,31 may pivot about axle 46 between a first position wherein the heads 42,43 of the levers are spaced apart from bar 20, as seen in FIGS. 1 and 2, and a second position wherein the heads closely overlay the bar so as to be graspable therewith. The inwardly facing ends of the heads are in close proximity the one to the other, so as to facilitate the actuation and grasping of the levers with a single hand. Levers 30,31 are conveniently biased to their first position by a tension transmitted through links 32,33 from the wheel and auger clutches, although other arrangements may be possible according to the particular apparatus to be controlled.

Figure 3:
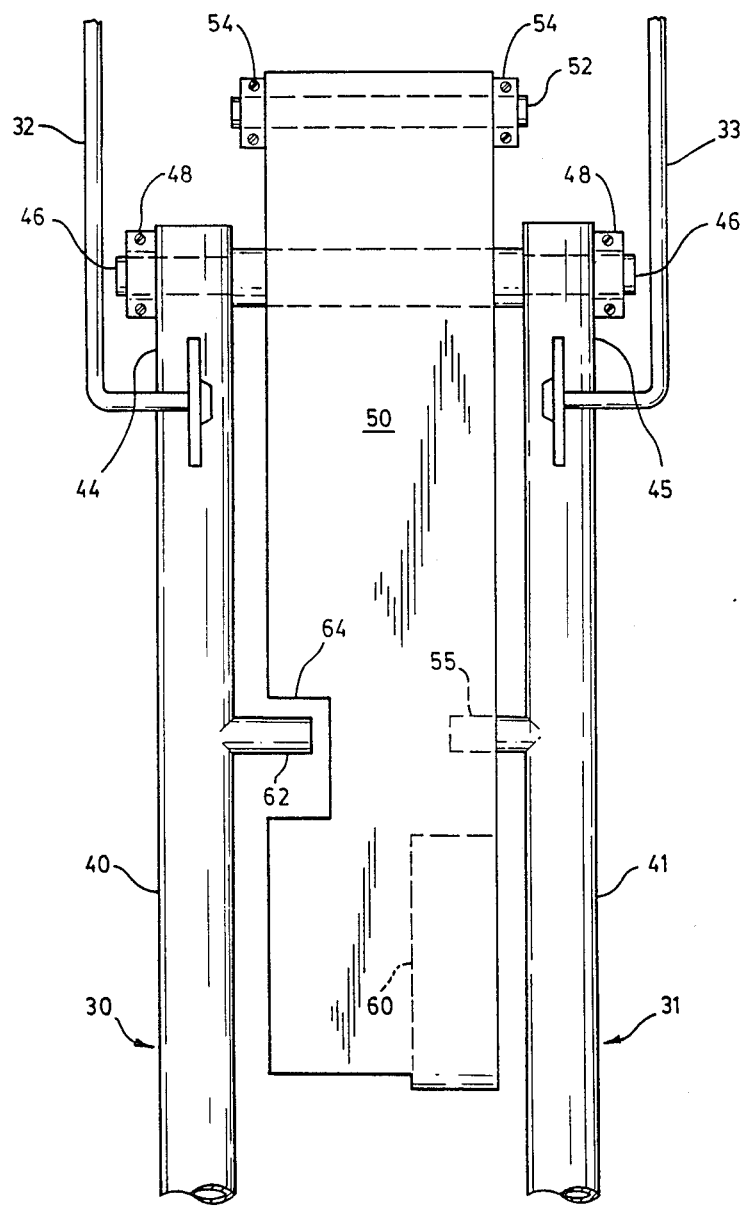
FIG. 3 shows in plan view, in further enlarged scale, the lower ends of the dead-man control levers of the control system and the latch thereof, as seen from the rear of the apparatus.

Referring now particularly to FIGS. 3 and 4, the control system includes a latch 50 which, as seen from the upper side, is in the form of a flat strip. The lower end of latch 50 (the upper part as seen in FIG. 3) is pivotally connected to console 22 by an axle 52 and bearings 54 which located forwardly of axle 46. Shank 41 is provided with an inwardly facing pin 55, and latch 50 is biased under the influence of its weight, or optionally by the use of a spring, into contact with pin 55. The lateral side of latch 50 supported by pin 55 is folded downwardly and backwardly at the upper, distal end thereof to form a tongue 60, which is parallel to strip and spaced apart therefrom by a somewhat greater distance than the diameter of pin 55 to form a keyway for pin 55. Laterally opposed to pin 55 and mounted for shank 40 to be inwardly facing is a similar pin 62, also referred to as key 62. Latch 50 is provided with an opening 64 forming a keyway for pin 62.

Considering now the operation of the control system, as seen in FIG. 3 the levers 30 and 31 locate in their first positions, which is to say they are biased with the heads 42,43 of the levers spaced apart from bar 20. It will be apparent that lever 30 may be actuated independently of lever 31, as key opening 64 is positioned so as not to interfere with key 62 when lever 31 is in its first position. Similarly lever 31 may be actuated independently of lever 30. Additionally, levers 30 and 31 may be operated together. The function of latch 50 is best seen in relation to FIGS. 5-7. As lever 31 rotates from its first position (FIG. 5) through an intermediate position (FIG. 6) to its second position (FIG. 7) pin 55 describes a circular arc 66 centred on axle 46. In the intermediate position, pin 55 is captured by tongue 60. Still further rotation of lever 31 then acts to urge latch 50 in the same direction. If key 62 is trapped by latch 50, lever 30 will be interconnected to lever 31 by the latch, which is to say that the continued actuation of lever 31 will actuate lever 30.

As latch 50 rotates about pivot 52, key opening 64 describes a circular path bounded by arcs 70. Essentially in this embodiment, key 62 travels on the same arcuate path 66 as pin 55. It may here be stressed that this is a matter of convenience, and that pin 55 and key 62 could travel on different paths. In the present instance, until such time as lever 31 reaches its intermediate position, key opening 64 will always locate to permit the passage of key 62 therethrough. Once lever 31 is actuated beyond its intermediate position, key 62 will, if located in the latch, be trapped therein, and if located outside the latch, key 62 will be locked out. This lock out feature is particularly useful where, for example, lever 31 controls the wheel drive of a lawnmower and lever 30 the blade brake, as the blade will remain inoperative if the wheel drive is engaged prior to the blade brake lever being actuated.

Figure 8:
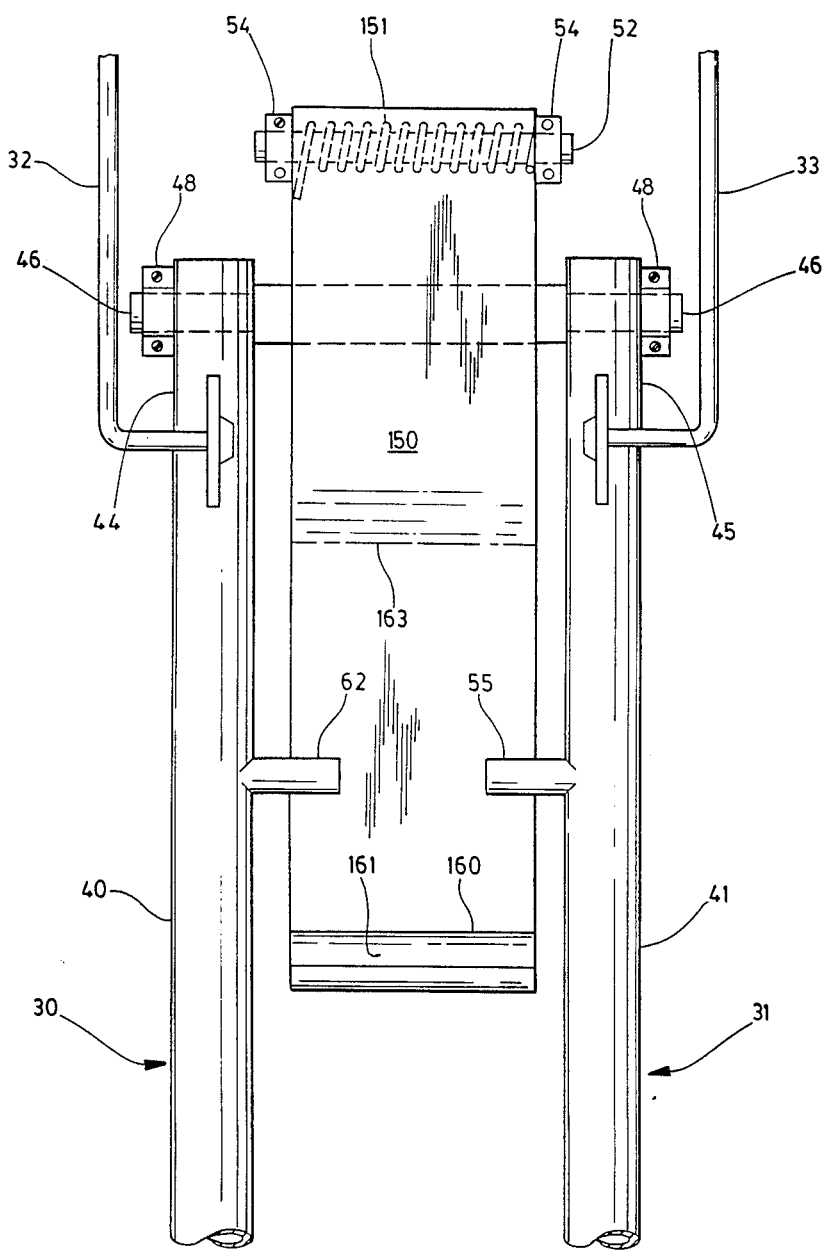

In accordance with a second embodiment seen in FIGS. 8 and 9, the control system includes a latch 150 which is fashioned from a flat spring strip material. As considered by a person positioned to use the control system, the lower end of latch 150 (the upper end as illustrated in FIG. 8) is conveniently secured to console 22 by an axle 52 and bearings 54 to permit the latch to pivot thereabout. A light helical spring 151 urges latch 150 away from the console 22 towards pins 55 and 62. The distal end of latch 150 is formed into an S profile across the width of the latch to provide a small tongue 160 which, together with the underlaying portion of the latch, forms a keyway, and at the entrance thereto, a lip 161. Latch 150 is formed with a knee 163 thereacross at an intermediate portion of the latch locating between pivot axle 52 and pins 55,62, so as to turn the upper part of the latch towards the pins.

Considering the operation of this second embodiment as thus far described, with levers 30 and 31 each located in their first positions, either lever may be operated independently of the other, and move from its first to its second position. If lever 30 be first operated, pin 62 will entrain the movement of latch 150, and due to the movement of the latch about a greater radius than pin 62, pin 62 will move relative to the latch, towards tongue 160. At about 15° before the limit of travel of lever 30 is reached, in a position shown in dashed outline in FIG. 9, pin 62 wil be captured and latched behind tongue 160. Further movement of lever 30 towards its second position, will firmly engage pin 62 behind tongue 160, at which point lever head 43 will normally be in its closely overlaying position relative to cross bar 20. The 15° movement of lever 30 is usually within the scope of the lost movement generally associated with a control, such as a clutch, operated by lever 30. Thus it will be appreciated that lever 30, while in a position to fully engage a control, can be moved between a point in which it is latched by latch 150 and a point in which it releases from latch 150. If both levers 30 and 31 are conjointly moved to their second positions in which their heads 42,43 fully overlay cross bar 20 so as to be graspable therewith and in which both pins 55 and 62 are captured behind tongue 160, the release of either of levers 30 and 31 will cause the other lever to be unlatched and permit it to return to its first position.

A stop surface, which may be conveniently formed by console 22, locates beneath latch 150 and is positioned so as to prevent the further rotation of the latch once pin 62 is fully captured behind tongue 160. Assuming that control lever 30 is in its second position, and that control lever 31 is moved from its first position towards its second position, pin 55 will engage lip 161 which will act as a lock-out to prevent the lever moving fully into its second position. However, further pressure on lever 31 will cause lip 161 to ride up on pin 55 and thereby permit lever 31 to engage its second position, with pin 55 latched behind tongue 160. This further pressure may be relatively high, so as to prevent the lock-out function of lip 161 being inadvertently overridden.

While a specific sequence of operation of levers, 30,31 has been described, it will be appreciated that since the control system of the second embodiment has a symmetry, either lever 30 or 31 could be operated first, as desired. It will also be appreciated that an asymmetry could be introduced for example by extending tongue 160 on one lateral side of latch 150 more than on the opposed lateral side thereof, so as to prevent the late entry of a pin behind tongue 160 on one side only of the latch.

Reverting again to FIG. 9, it will be seen that knee 163 is in contact with the stop surface formed by console 22 somewhat before other portions of the latch. Accordingly latch 150 will tend to rotate about knee 163 as pin 62 and/or pin 55 moves from adjacent its threshold entry position to its fully latched position behind tongue 160. This has the effect of reducing the relative movement of the pins relative to the tongue 160 preferably over about the last 20° arc of movement of the shanks 40, 41, of control levers 30,31, so as to render it easier for the lip to ride over pins 55 and 62.

While in the preferred embodiments the wheel drive and auger drive are shown as being connected to specific ones of the dead-man levers, it will be apparent that the connections may be reversed, should this be desired in order to achieve a particular purpose. It will also be apparent that other apparatus, both mechanized and non-mechanized, and other functions thereof may be controlled using the control system set forth. It will be still further apparent that many changes to the particular mechanical arrangements illustrated may be made while achieving the same aims and objects set forth, and it is intended that these be covered by the claims appended hereto.

We claim:

1. A control system for an apparatus comprising:
   first and second levers for respectively controlling first and second functions of said apparatus, each said lever having a first and second position respectively for defining an inoperative and operative condition of said function;
   pivot means mounting said levers for rotary movement between said first and second positions;
   latch means having an axially extending major surface and axially opposed ends thereto, said latch means including a tongue portion at one said axial end spaced apart from said major surface to form therewith a keyway having an entry opening thereto;
   first and second key means respectively mounted from said first and second levers for movement therewith;
   means mounting said latch means for movement about the axial end thereof opposite to said keyway and for biasing said major surface towards contact with said second key means;
   movement of said second lever from its first to its second position entraining movement of said latch means and the relative movement of said keyway and said second key means, said second key means entering said keyway proximate the second position of said second lever;
   said tongue portion then serving to interfere with the first key means and impede the subsequent movement of said first lever from its first position to its second position.

2. A control system as defined in claim 1, wherein said tongue portion is provided with a resiliently deformable lip at the entry to said keyway, whereby as said first lever is moved towards its second position subsequently to the second lever engaging its second position, said first key means initially engages said lip to impede the further movement of said first lever, and upon exerting a greater pressure upon said first lever, said lip rides over said first key means to permit the entry of said first key means into said keyway to be captured therein.

3. A control system as defined in claim 2, wherein said latch is constructed from a spring material, and is formed with a knee intermediate the axial ends thereof, further including stop means supported from said apparatus for restricting the movement of said knee as said second layer approaches its second position, thereby serving to diminish the relative movement of said tongue and said second key means.

4. A control system as defined in claim 3, wherein said knee first engages said stop means when said second lever is at about a 20° arc of travel before its second position is reached.

5. A control system as defined in claim 3, wherein said second key means locates at the entry to said keyway when said second lever is at about a 15° arc of travel before its second position is reached.

6. A control system as defined in claim 2, wherein said first and second key means are generally identical and opposed, whereby either said first lever or said second lever may be first moved to its second position and the other lever may be subsequently moved to its second position.

* * * * *

UNITED STATES PATENT AND TRADEMARK OFFICE
CERTIFICATE OF CORRECTION

PATENT NO.  : 4,869,124

DATED       : September 26, 1989

INVENTOR(S) : Sandor (Stan) J. Czeban, et al.

It is certified that error appears in the above-identified patent and that said Letters Patent is hereby corrected as shown below:

Column 1, line 20, "respective" should read --respectively--;

Column 3, line 45, "dead-mean" should read --dead-man--; and

Column 6, line 64, "layer" should read --lever--.

Signed and Sealed this

Nineteenth Day of May, 1992

Attest:

DOUGLAS B. COMER

*Attesting Officer*          Acting Commissioner of Patents and Trademarks